Sept. 11, 1934.  T. R. ENGBERG  1,972,983
REVERSE SAFETY LOCK
Filed June 28, 1933  3 Sheets-Sheet 1

Inventor
T. R. Engberg

By Clarence A. O'Brien
Attorney

Sept. 11, 1934.   T. R. ENGBERG   1,972,983
REVERSE SAFETY LOCK
Filed June 28, 1933   3 Sheets-Sheet 2

Inventor
T. R. Engberg
By Clarence A. O'Brien
Attorney

Sept. 11, 1934.  T. R. ENGBERG  1,972,983
REVERSE SAFETY LOCK
Filed June 28, 1933  3 Sheets-Sheet 3
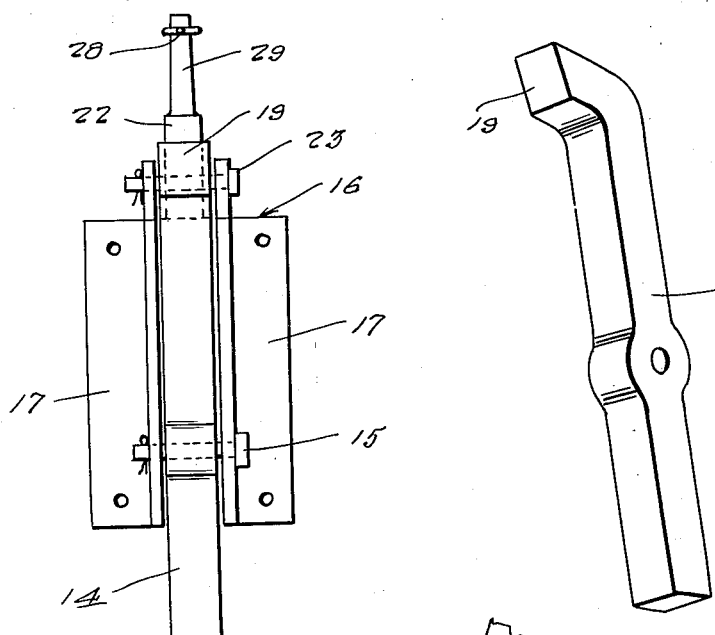
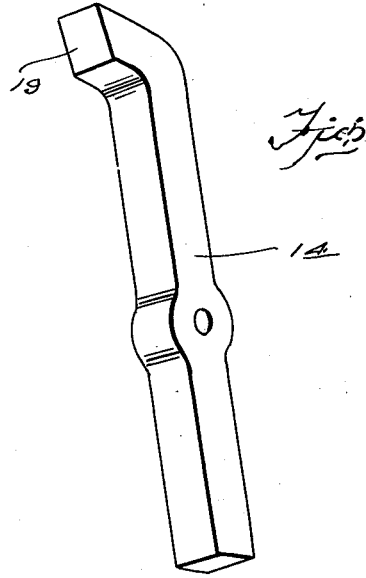
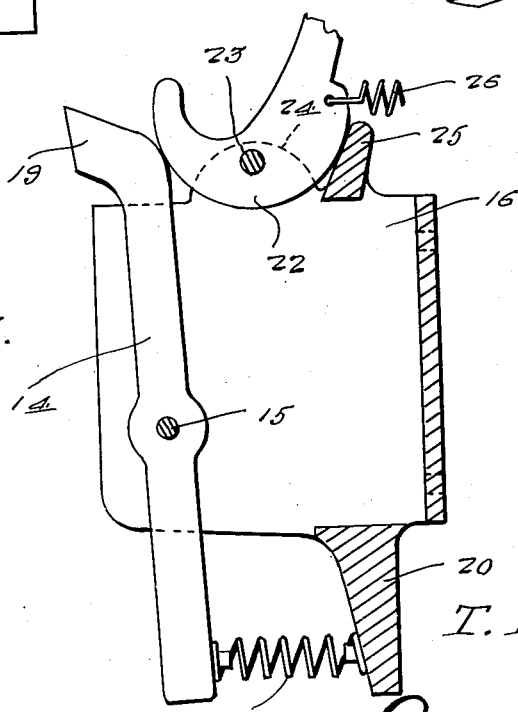

Patented Sept. 11, 1934

1,972,983

UNITED STATES PATENT OFFICE 1,972,983

REVERSE SAFETY LOCK

Thaddeus R. Engberg, Riverside, Calif., assignor of twenty per cent to B. B. Bush and thirty per cent to John Jahn, Riverside, Calif.

Application June 28, 1933, Serial No. 678,075

2 Claims. (Cl. 188—30)

This invention relates broadly to motor driven vehicles, and more particularly to improved means for locking the vehicle against rearward movement when either parked on, or ascending a grade or incline. Briefly the invention consists in the provision of means readily controlled by the operator for positively preventing reverse movement of the propeller shaft of the automobile to thereby secure the automobile against drifting backward either during a shifting from one speed to the other while ascending a grade, or when the automobile is parked on a grade. Further, in accordance with the present invention a device of the character above referred to is provided which will automatically move to a released inoperative position upon forward movement of the vehicle.

The invention together with its numerous objects and advantages will be best understood from a study of the following description taken in connection with the accompanying drawings wherein:

Figure 3 is a sectional elevational view through a bracket and associated parts forming part of the invention.

Figure 4 is a face view of the organization shown in Figure 3.

Figure 5 is a fragmentary sectional view showing the manner of securing the ratchet wheel between the drum of the emergency brake and the universal joint and Figure 6 is a perspective view of a dog to be hereinafter more fully referred to.

Figure 1:
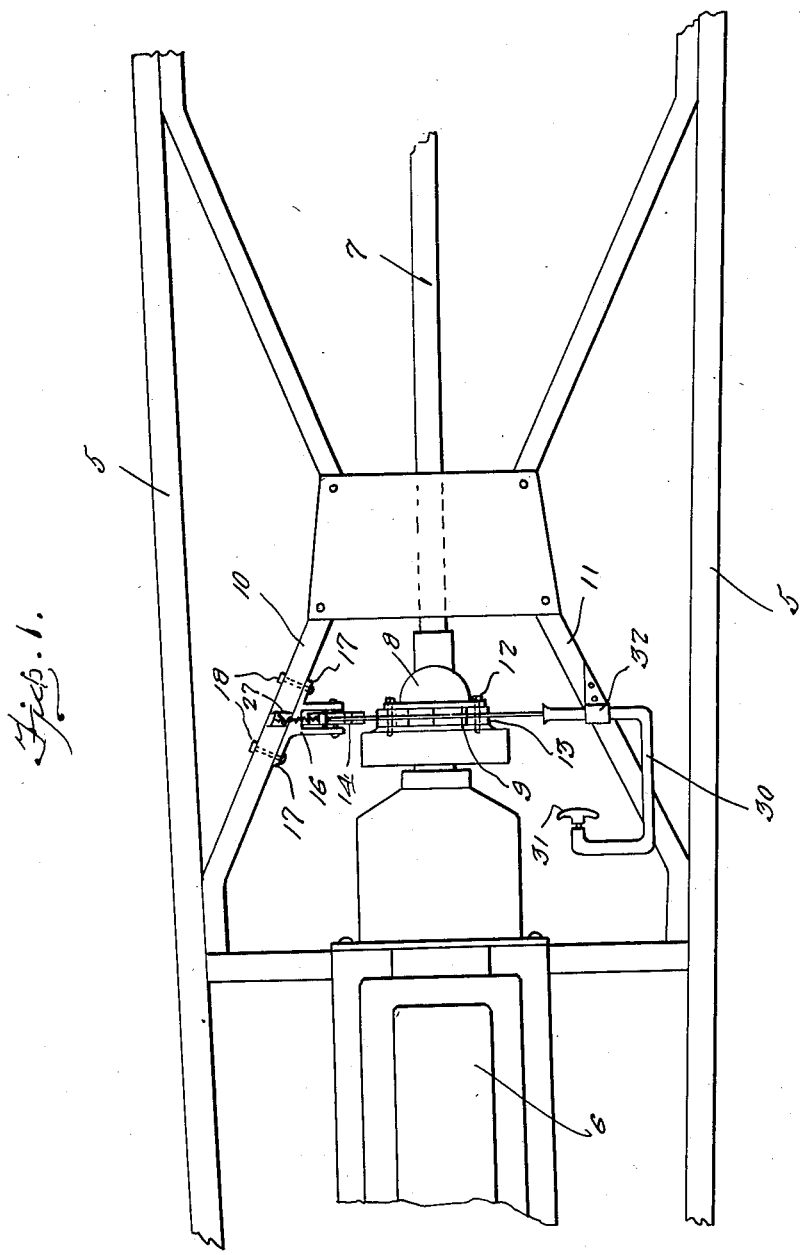
Figure 1 is a plan view illustrating the application of the invention to a motor driven vehicle.

Referring to the drawings by reference numerals it will be seen that 5 indicates generally the side frame bars, of the chassis of a vehicle, 6 the internal combustion engine, 7 the propeller shaft, 8 the universal joint, and 9 the emergency brake drum. In the present instance the chassis frame also includes opposed brace bars 10 and 11 respectively.

In accordance with the present invention there is secured through the medium of bolts or other fastening elements 12 between the universal joint 8 and the emergency brake drum 9 a ratchet wheel 13 with which is cooperable a dog 14. The dog 14 is mounted on a pivot 15 between the sides of a substantially U-shaped bracket 16 that at its closed end is provided with attaching flanges 17 whereby the bracket 16 is secured by bolts 18 to one of the brace bars, in the present instance, the brace bar 10. The upper end of the dog 14 is provided as at 19 to engage the teeth of the ratchet wheel 13, while disposed between the free end of the dog 14 and a depending lug 20 provided on the bracket 16 is a spring 21 that urges the dog 14 to rotate in an anti-clockwise direction (see Figure 3) to normally maintain the end 19 of the dog out of engagement with the ratchet wheel 13.

Acting on the end 19 of the dog 14 in opposition to the spring 21 for moving said end 19 of the dog into engagement with the ratchet wheel 13 is a cam 22 that is pivoted as at 23 between the ears 24 provided on the upper edges of the sides of the bracket 16. On the side of the pivot 23 opposite to the dog 14 said bracket 16 is provided with an attachment or stop 25 for limiting rotation of the cam 22 in a clockwise direction against the action of a spring 26. Spring 26 is connected at one end to the cam 22, and at a relatively opposite end is anchored to a bracket 27 provided on the aforementioned brace bar 10.

For manually operating the cam 22 there is provided a flexible operating or control rod 28 that at one end is secured to a lever 29 provided on one end of the cam 22, preferably being integral with the cam as shown. The flexible cable or member 28 is trained through a flexible casing 30 that has one end suitably connected to the instrument board of the automobile. The free end of the cable 28 extends through said one end of the casing 30 and is equipped with a knob 31 to be grasped by the operator for pulling the cable 28 to operate the device. At its free end the casing 30 is provided with an attaching bracket 32 that is secured to the other of the brace bars, in the present instance the brace bar 11 as shown in Figure 1.

The operation of the device is thought clear and may be briefly explained as follows.

Figure 2:
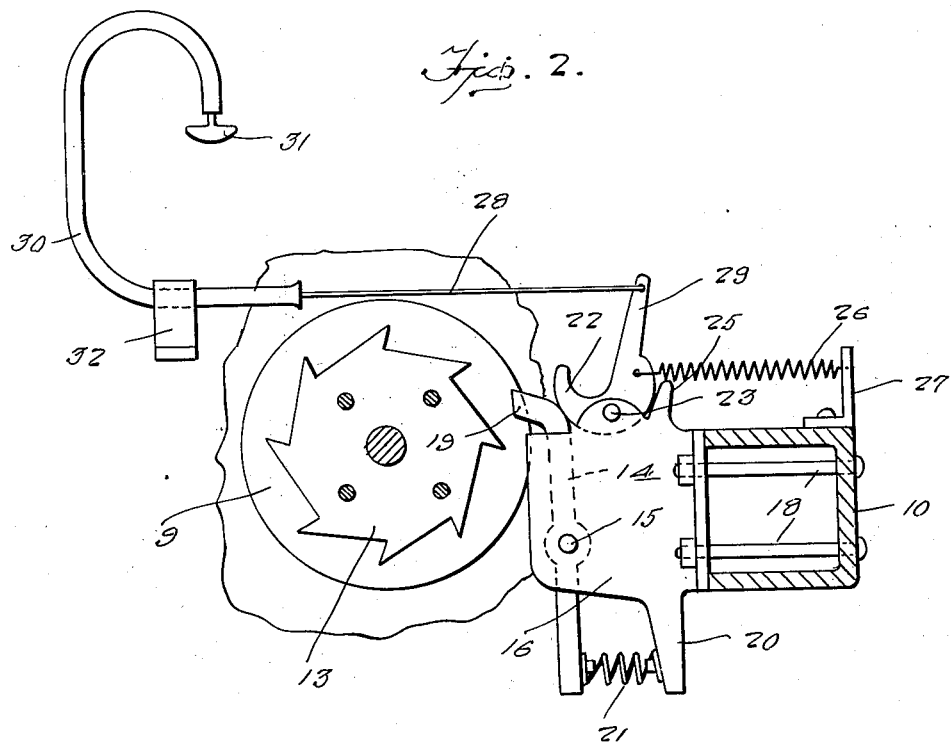
Figure 2 is a view partly in section and partly in elevation showing the position of the parts of the device when released.
Figure 5:
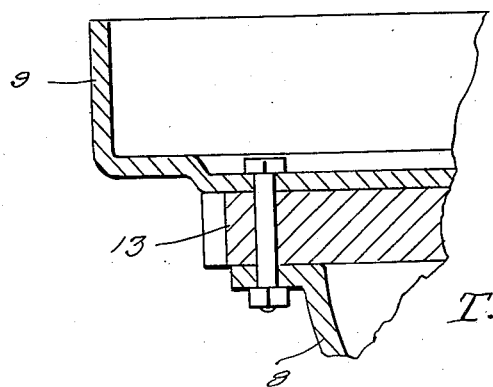

Normally the parts are in the position shown in Figure 2. When it is desired to positively secure the propeller shaft 7 against retrograde movement and thereby prevent reverse movement of the automobile the operator, grasping the knob 31, pulls on the cable 28 to thereby rotate the cam 22 in an anti-clockwise direction against the action of spring 26. Rotation of the cam 22 in this direction, by reason of the engagement of the cam with the dog 14 causes the dog 14 to also rotate in an anti-clockwise direction for positioning the end 19 of the dog in the path of the teeth of the ratchet wheel 13. The vehicle then is permitted to drift rearwardly or backward so that a tooth on the ratchet wheel 13 will engage the end 19 of the dog 14 preventing further reverse rotation of the propeller shaft and backward movement of the automobile. With the parts arranged as now described obviously the vehicle will be securely locked against backward movement whether the vehicle is parked on or is ascending a grade. When the device is used in the manner just explained to prevent the vehicle from drifting backward a changing of gears from one speed to another may be easily and readily effected by the operator of the vehicle.

As is thought apparent as soon as the end 19 of the dog has been moved into engagement with the ratchet wheel 13 the operator may release the knob 31 thus permitting the cam 22 to rotate in a clockwise direction under the action of spring 26, the dog 14 remaining in egagement with the ratchet wheel as long as the load is on the propeller shaft. However, as soon as the automobile begins to move forward thus causing the propeller shaft to rotate in an anti-clockwise direction (reference being had to Figure 2), the load on the end 19 of the dog 14 is released and the latter under action of spring 21 will then return to its normal or inactive position, which is the position shown in the drawings.

Having thus described my invention, what I claim as new is:

1. In a reverse safety lock for automobiles, the combination with a propeller shaft, a toothed ratchet wheel driven thereby, and a pawl adapted to engage the teeth of the ratchet wheel to hold the shaft from rotation in reverse direction; of a supporting bracket for said pawl, said bracket being substantially U-shaped and having spaced parallel side members and an end web connecting said side members, a pivot on which the pawl is secured mounted between the side members of said bracket, lugs projecting upwardly from the upper edges of the side members of said bracket, a cam member pivotally mounted between said lugs to engage one end of the pawl for urging said end into engagement with the teeth of the ratchet wheel, a stop member for limiting rotation of the pawl in one direction projecting upwardly from the upper edges of the side members of said bracket, and being integral with said bracket, a lug integral with the side members of the bracket and depending downwardly therefrom, a spring device interposed between said lug and the pawl in a manner to rotate the pawl out of engagement with the ratchet wheel, and means connected with the cam for rotating it to press the pawl into engagement with the ratchet wheel against the action of said spring.

2. In combination, a bracket having spaced parallel side members, a pawl pivotally mounted intermediate its ends between said side members, a stop lug integral with the upper edges of said side members, a cam member pivotally mounted between said side members and engaging with the pawl for rotating the same in one direction, and with the stop member for limiting rotation of the cam member in a reverse direction, a lug integral with said side members at the lower edges thereof, and a spring connecting one end of the pawl with said lug so as to normally urge the pawl to rotate in a direction to engage the free end of the pawl with said cam.

THADDEUS R. ENGBERG.